(12) United States Patent
Singh et al.

(10) Patent No.: US 12,568,127 B2
(45) Date of Patent: Mar. 3, 2026

(54) METHODS, SYSTEMS, AND COMPUTER READABLE MEDIA FOR LOAD BALANCING SESSION INITIATION PROTOCOL (SIP) REGISTRATION REQUESTS USING Cx INTERFACE HEALTH STATUS

(71) Applicant: Oracle International Corporation, Redwood Shores, CA (US)

(72) Inventors: Arvind Kumar Singh, Bangalore (IN); Agnivesh Kumpati, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 412 days.

(21) Appl. No.: 18/209,325

(22) Filed: Jun. 13, 2023

(65) Prior Publication Data

US 2024/0422204 A1　Dec. 19, 2024

(51) Int. Cl.
*H04L 12/66* (2006.01)
*H04L 65/1073* (2022.01)
*H04L 65/1104* (2022.01)

(52) U.S. Cl.
CPC ...... *H04L 65/1104* (2022.05); *H04L 65/1073* (2013.01)

(58) Field of Classification Search
CPC ............. H04L 12/1895; H04L 41/0654; H04L 43/065; H04L 41/145; H04L 43/06; H04L 41/06; H04L 43/0876; H04L 63/08; H04L 41/0681; H04L 41/08; H04L 41/0803; H04L 41/5032; H04L 43/062; H04L 43/045; H04L 43/0847; H04L 43/0805;

H04M 3/5175; H04M 3/5233; H04M 3/5191; H04M 15/8044; H04M 15/58; H04M 2215/0188; H04M 2215/81
See application file for complete search history.

(56) References Cited

U.S. PATENT DOCUMENTS

| | | | |
|---|---|---|---|
| 7,929,419 B2 | 4/2011 | Sprague | |
| 8,385,532 B1 * | 2/2013 | Geist .................. | H04M 3/5175 |
| | | | 379/265.06 |

(Continued)

OTHER PUBLICATIONS

Korhonen et al., "Diameter Overload Indication Conveyance," IETF RFC 7683 (Oct. 2015).

*Primary Examiner* — Kharye Pope
(74) *Attorney, Agent, or Firm* — Jenkins, Taylor & Hunt, P.A.

(57) ABSTRACT

An method for load balancing session initiation protocol (SIP) registration requests using Cx health status includes monitoring, by an S-CSCF, at least one health parameter of a Cx interface associated with the S-CSCF. The method further includes determining, by the S-CSCF, a health category of the Cx interface associated with the S-CSCF based on the at least one health parameter. The method further includes sending, by the S-CSCF to an Interrogating Call Session Control Function (I-CSCF), an indication of the health category of the Cx interface associated with the S-CSCF. The method further includes load balancing, by the I-CSCF, SIP registration requests between the S-CSCF and at least one additional S-CSCF based on the received indication of the health category of the Cx interface associated with the S-CSCF.

20 Claims, 8 Drawing Sheets

(56) References Cited

U.S. PATENT DOCUMENTS

| | | | |
|---|---|---|---|
| 9,413,670 B2 | 8/2016 | Chiduruppa et al. | |
| 9,813,558 B1 * | 11/2017 | Brula | G06F 16/283 |
| 2011/0320544 A1 * | 12/2011 | Yee | H04L 43/10 |
| | | | 709/228 |
| 2013/0242754 A1 * | 9/2013 | Shaikh | H04W 24/04 |
| | | | 370/242 |
| 2014/0018039 A1 * | 1/2014 | Lau | H04W 8/20 |
| | | | 455/411 |
| 2014/0079207 A1 * | 3/2014 | Zhakov | H04M 3/5233 |
| | | | 379/265.03 |
| 2016/0099871 A1 * | 4/2016 | Chiduruppa | H04L 65/1016 |
| | | | 709/226 |
| 2016/0380802 A1 * | 12/2016 | Kunz | H04L 41/06 |
| | | | 370/216 |
| 2017/0085455 A1 * | 3/2017 | Chiang | H04L 65/1073 |
| 2017/0339740 A1 * | 11/2017 | Abichandani | H04W 76/10 |
| 2021/0160666 A1 * | 5/2021 | Zaifuddin | H04W 76/19 |

* cited by examiner

<u>800</u>

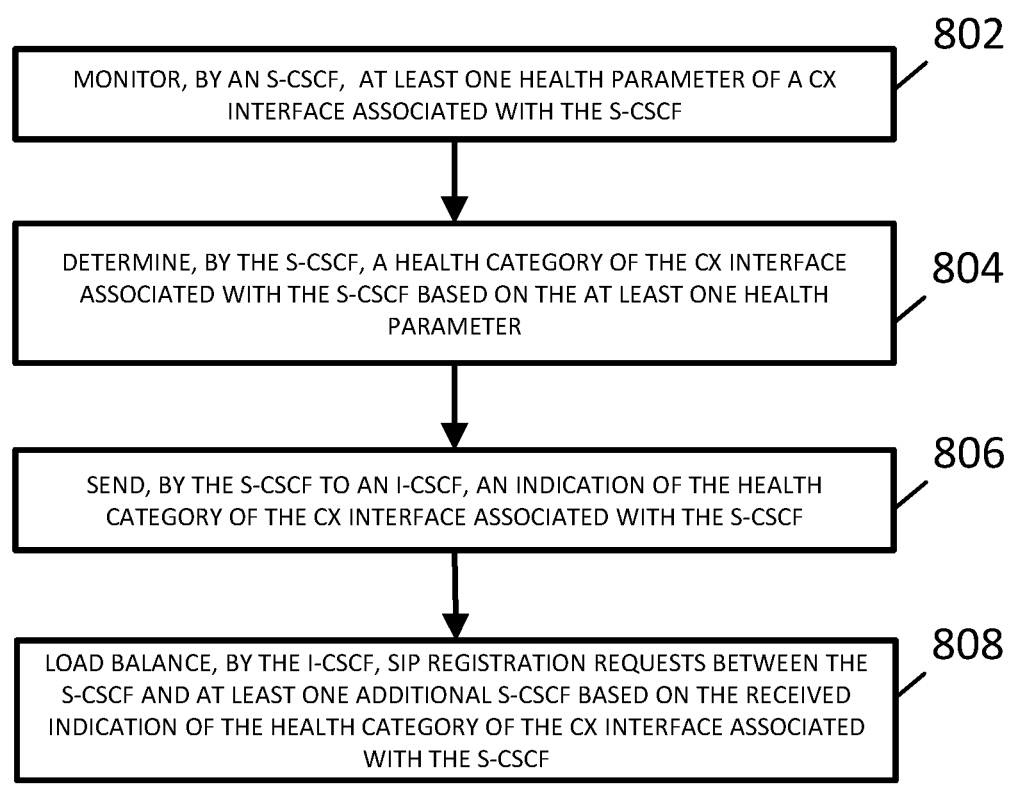

802

MONITOR, BY AN S-CSCF, AT LEAST ONE HEALTH PARAMETER OF A CX INTERFACE ASSOCIATED WITH THE S-CSCF

804

DETERMINE, BY THE S-CSCF, A HEALTH CATEGORY OF THE CX INTERFACE ASSOCIATED WITH THE S-CSCF BASED ON THE AT LEAST ONE HEALTH PARAMETER

806

SEND, BY THE S-CSCF TO AN I-CSCF, AN INDICATION OF THE HEALTH CATEGORY OF THE CX INTERFACE ASSOCIATED WITH THE S-CSCF

808

LOAD BALANCE, BY THE I-CSCF, SIP REGISTRATION REQUESTS BETWEEN THE S-CSCF AND AT LEAST ONE ADDITIONAL S-CSCF BASED ON THE RECEIVED INDICATION OF THE HEALTH CATEGORY OF THE CX INTERFACE ASSOCIATED WITH THE S-CSCF

FIG. 8

METHODS, SYSTEMS, AND COMPUTER READABLE MEDIA FOR LOAD BALANCING SESSION INITIATION PROTOCOL (SIP) REGISTRATION REQUESTS USING Cx INTERFACE HEALTH STATUS

TECHNICAL FIELD

The subject matter described herein relates to managing session SIP registration requests. More specifically, the subject matter relates to methods, systems, and computer readable media for load balancing SIP registration requests using Cx interface health status.

BACKGROUND

SIP is a signaling protocol used for initiating, maintaining, modifying, and terminating real-time communications sessions between Internet protocol (IP) devices. SIP enables voice, messaging, video and other communications applications and services between two or more users on IP networks. SIP manages a setup phase of calls configured to transmit voice and multimedia content via IP networks.

The Internet Protocol Multimedia Subsystem (IMS) provides a networking framework for delivering multimedia communications over IP networks. IMS uses SIP to enable VoIP communications. An Interrogating Call Session Control Function (I-CSCF) receives a SIP registration request from a Proxy Call Session Control Function (P-CSCF), originating from a user, and forwards the request to a selected Serving Call Session Control Function (S-CSCF) in a cluster of S-CSCFs to process the SIP user. Current load balancing of SIP registration requests is performed by the I-CSCF based on S-CSCF status information received from the S-CSCFs such as central processing unit (CPU) and memory usage for the corresponding S-CSCFs. However, load balancing based on S-CSCF status information is inefficient because the ability to process SIP registration requests may depend on factors other S-CSCF availability.

Accordingly, there is a need for improved methods, systems, and computer readable media that load balance SIP registration request based on factors other than or in addition to S-CSCF status information.

SUMMARY

Methods, systems, and computer readable media for load balancing session initiation protocol (SIP) registration requests using Cx interface health status are disclosed. An example method for load balancing SIP registration requests using Cx interface health status includes monitoring, by an S-CSCF, at least one health parameter of a Cx interface associated with the S-CSCF. The method further includes determining, by the S-CSCF, a health category of the Cx interface associated with the S-CSCF based on the at least one health parameter. The method further includes sending, by the S-CSCF to an Interrogating Call Session Control Function (I-CSCF), an indication of the health category of the Cx interface associated with the S-CSCF. The method further includes load balancing, by the I-CSCF, SIP registration requests between the S-CSCF and at least one additional S-CSCF based on the received indication of the health category of the Cx interface associated with the S-CSCF.

According to another aspect of the subject matter described herein, the health category reflects a probability the S-CSCF will successfully handle registration with an HSS in response to a SIP registration request.

According to another aspect of the subject matter described herein, load balancing the SIP registration requests directed towards the S-CSCF comprises assigning, by the I-CSCF, a SIP registration request to the S-CSCF based on the received indication of the health category.

According to another aspect of the subject matter described herein, the method includes monitoring, by the at least one additional S-CSCF, at least one health parameter of a Cx interface associated with the at least one additional S-CSCF. The method may further include determining, by the at least one additional S-CSCF and based on the at least one health parameter, a health category of the Cx interface associated with the at least one additional S-CSCF. The method may further include sending, by the at least one additional S-CSCF and to the I-CSCF, an indication of the health category of the Cx interface associated with the at least one additional S-CSCF, wherein load balancing the SIP registration requests between the S-CSCF and the at least one additional S-CSCF comprises assigning a greater number of SIP registration requests to the S-CSCF than to the at least one additional S-CSCF in response to the health category of the Cx interface associated with the S-CSCF indicating better health than the health category of the Cx interface associated with the at least one additional S-CSCF.

According to another aspect of the subject matter described herein, load balancing the SIP registration requests includes removing an identifier for the S-CSCF from a load balancing list in response to the Cx interface associated with the S-CSCF having a predetermined health category.

According to another aspect of the subject matter described herein, the method includes updating, by the S-CSCF, the health category of the Cx interface associated with the S-CSCF in response to detected changes in the at least one health parameter.

According to another aspect of the subject matter described herein, the at least one health parameter comprises a first health parameter based on a ratio of error responses to successful responses received by the S-CSCF within a predetermined time period.

According to another aspect of the subject matter described herein, the at least one health parameter includes a second health parameter based on availability of a connection between the S-CSCF and the HSS.

According to another aspect of the subject matter described herein, the at least one health parameter includes a third health parameter based on a Diameter Overload Indication Conveyance (DOIC).

An example system for load balancing SIP registration requests using cx interface health status includes an S-CSCF including at least one processor and a memory configured for monitoring at least one health parameter of a Cx interface associated with the S-CSCF. The S-CSCF is further configured for determining a health category of the Cx interface associated with the S-CSCF based on the at least one health parameter. The S-CSCF is further configured for sending, to an I-CSCF, an indication of the health category of the Cx interface associated with the S-CSCF. The system also includes an I-CSCF including at least one processor and a memory configured for load balancing SIP registration requests between the S-CSCF and at least one additional S-CSCF based on the received indication of the health category of the Cx interface associated with the S-CSCF.

According to another aspect of the subject matter described herein, the health category reflects a probability the S-CSCF will successfully handle registration with an HSS in response to a SIP registration request.

According to another aspect of the subject matter described herein, load balancing the SIP registration requests directed towards the S-CSCF comprises assigning a SIP registration request to the S-CSCF based on the received indication of the health category.

According to another aspect of the subject matter described herein, the system further comprises the at least one additional S-CSCF configured for monitoring at least one health parameter of a Cx interface associated with the at least one additional S-CSCF. The at least one additional S-CSCF is further configured for determining, based on the at least one health parameter, a health category of the Cx interface associated with the at least one additional S-CSCF. The at least one additional S-CSCF is further configured for sending, to the I-CSCF, an indication of the health category of the Cx interface associated with the at least one additional S-CSCF, wherein load balancing the SIP registration requests between the S-CSCF and the at least one additional S-CSCF comprises assigning a greater number of SIP registration requests to the S-CSCF than to the at least one additional S-CSCF in response to the health category of the Cx interface associated with the S-CSCF indicating better health than the health category of the Cx interface associated with the at least one additional S-CSCF.

According to another aspect of the subject matter described herein, load balancing the SIP registration requests includes removing an identifier for the S-CSCF from a load balancing list in response to the Cx interface associated with the S-CSCF having a predetermined health category.

According to another aspect of the subject matter described herein, the S-CSCF is configured for updating the health category of the Cx interface associated with the S-CSCF in response to detected changes in the at least one health parameter.

According to another aspect of the subject matter described herein, the at least one health parameter includes a first health parameter based on a ratio of error responses to successful responses received by the S-CSCF within a predetermined time period.

According to another aspect of the subject matter described herein, the at least one health parameter includes a second health parameter based on availability of a connection between the S-CSCF and the HSS.

According to another aspect of the subject matter described herein, the at least one health parameter includes a third health parameter based on a Diameter Overload Indication Conveyance (DOIC).

According to another aspect of the subject matter described herein, a non-transitory computer readable medium having stored thereon executable instructions that when executed by at least one processor of at least one computer cause the at least one computer to perform steps. The steps include, at a Serving Call Session Control Function (S-CSCF), monitoring at least one health parameter of a Cx interface associated with the S-CSCF. The steps further include, at the S-CSCF, determining a health category associated of the Cx interface associated with the S-CSCF based on the at least one health parameter. The steps further include, at the S-CSCF, sending, to an Interrogating Call Session Control Function (I-CSCF), an indication of the health category of the Cx interface associated with the S-CSCF. The steps further include, at the I-CSCF, load balancing SIP registration requests between the S-CSCF and at least one additional S-CSCF based on the received indication of the health category of the Cx interface associated with the S-CSCF.

According to another aspect of the subject matter described herein, load balancing the SIP registration requests directed towards the S-CSCF comprises assigning a SIP registration request to the S-CSCF based on the received indication of the health category.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which:

FIG. 8 is a flow diagram illustrating an example method for load balancing SIP registration requests using Cx interface health status.

DETAILED DESCRIPTION

The subject matter described herein includes methods, systems, and computer readable media for load balancing SIP registration requests using Cx interface health status. A P-CSCF receives SIP registration requests from user equipment and forwards the requests to an I-CSCF, which then selects, for each request, an S-CSCF from a cluster of S-CSCFs to process the request. The amount of SIP registration requests the I-CSCF forwards to a specific S-CSCF may exceed the S-CSCF's current capacity to process the requests, which may result in registration failures. To avoid dropping SIP registrations, the I-CSCF load balances the SIP registration requests among the S-CSCFs based on health indicators of Cx interfaces received from the corresponding S-CSCFs to reduce the likelihood of SIP registration failures and better utilize each S-CSCF's capabilities.

Figure 1:
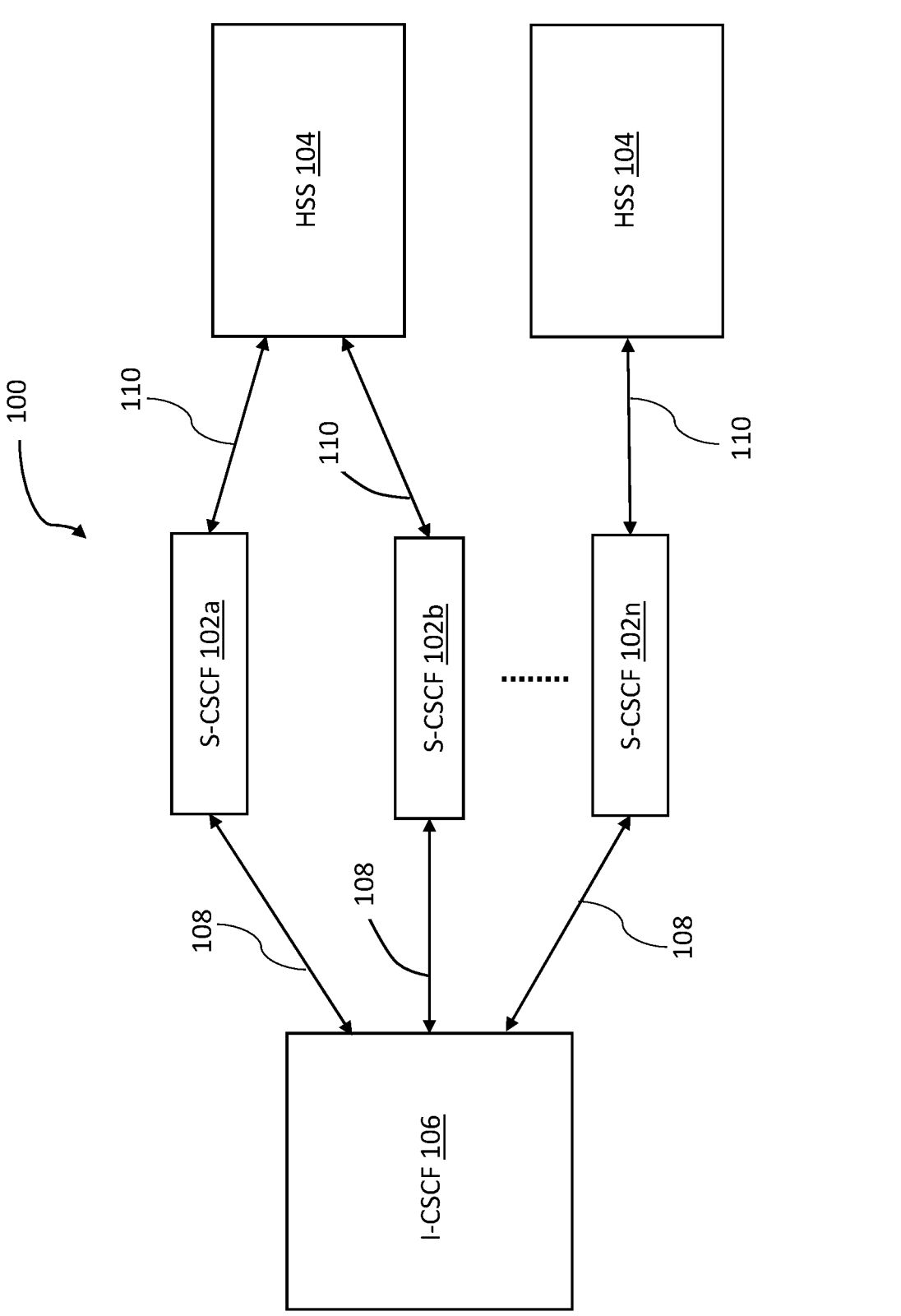
FIG. 1 is a block diagram illustrating an example system for load balancing SIP registration requests using Cx interface health status.

FIG. 1 is a block diagram illustrating an example system 100 for load balancing SIP registration requests using Cx interface health status. System 100 includes an I-CSCF 106 and one or more S-CSCFs, such as S-CSCF 102a-n shown in FIG. 1. S-CSCFs 102a-n may be implemented by an IMS network for SIP-based communication, for example without limitation Voice over IP (VOIP) calls. System 100 may include one or more P-CSCFs (not shown). The P-CSCF may receive a SIP registration request from a user, specifically user equipment, and forward the request to I-CSCF 106. I-CSCF 106 may receive a SIP registration request from the P-CSCF and send the request to a selected one of S-CSCF 102a-n. User equipment may include any device used by an end user, for example a personal computer, laptop computer, smartphone, tablet, etc. Each of P-CSCF, S-CSCFs 102a-n, and/or I-CSCF 106 may include one or more processors, memories, servers, proxies, and/or databases.

A user may register a user equipment with the IMS network by sending a REGISTER request to the P-CSCF, which may send the SIP registration request to I-CSCF 106. System includes at least one Home Subscriber Server 104. I-CSCF 106 may perform a HSS 104 lookup to identify capabilities of S-CSCFs 102a-n by sending a User-Authorization-Request (UAR) to the at least one HSS 104 and receiving a User-Authorization-Answer (UAA) indicating capabilities of S-CSCFs 102a-n. Generally, I-CSCF 106 may select one of S-CSCFs 102a-n, for example S-CSCF 102a, based on the capabilities and send the REGISTER request to the selected S-CSCF 102a. Additionally, as described herein, I-CSCF 106 load balances SIP registration requests among S-CSCFs 102a-n.

When S-CSCFs 102a-n are available to serve users, the S-CSCFs 102a-n establishes a transport protocol agnostic connection, for example without limitation a Transmission Control Protocol (TCP) connection, with I-CSCF 106 and initiates a Diameter Capabilities-Exchange-Request Capabilities-Exchange-Answer transaction, which establishes a Diameter connection between the S-CSCFs 102a-n and the I-CSCF 106 over a Diameter Interface 108. Each S-CSCF 102a-n may be connected to one HSS 104 via a Diameter-based interface such as a Cx interface 110, which provides a corresponding S-CSCF/HSS link. System 100 may include a plurality of HSSs 104, wherein each S-CSCFs 102a-n is connected to one of the HSSs 104. For example, some of S-CSCFs 102a-n, such as S-CSCF 102a and S-CSCF 102b, may be connected to a first HSS 104 and one or more other S-CSCFs may be connected to a second HSS 104, such as S-CSCF 102n. S-CSCFs 102a-n monitor at least one health parameter of Cx interface 110 associated with the corresponding S-CSCFs 102a-n. The at least one health parameter may include any of the health parameters described herein or any combination thereof. The at least one health parameter may include a health parameter based on a number of HSS 104 error responses received by S-CSCFs 102a-n within a predetermined time period. In some embodiments, a health parameter is based on a ratio of error responses to successful responses within a predetermined time period. A health parameter may be based on a percentage of error responses out of the total number of responses from HSS 104 received by S-CSCFs 102a-n within a predetermined time period. Examples of error responses from HSS 104 received by S-CSCF 102 may include DIAMETER_TOO_BUSY, DIAMETER_OUT_OF_SPACE, DIAMETER_UNABLE_TO_COMPLY, etc. The at least one health parameter may include a health parameter based on availability of a connection between S-CSCF 102a and HSS 104.

In some embodiments, system 100 may include one or more nodes that support the Diameter Overload Indication Conveyance (DOIC) standard, also referred to as DOIC nodes. For example, in some embodiments, S-CSCFs 102a-n, HSS 104, and/or Interrogating Call Session Control Function (I-CSCF) 106 (described below) may be DOIC nodes. In such embodiments, the at least one health parameter may include a health parameter based on a DOIC such as an overload report. DOIC allows Diameter servers to send overload reports requesting that Diameter clients reduce the traffic that they are sending to the server. HSS 104, acting as a reporting node, may generate an overload report. HSS 104 may send to S-CSCFs 102a-n the overload report indicating an overload occurrence. The overload report may include a request for overload abatement to reduce the reported overload on HSS 104, which the HSS 104 itself, S-CSCFs 102a-n, I-CSCF 106, and/or another Diameter node may address as a reacting node. In some embodiments, HSS 104 may generate an overload report attributing the overload to a specific S-CSCF, for example S-CSCF 102a.

S-CSCFs 102a-n may be configured to determine a health category of Cx interface 110 associated with the corresponding S-CSCFs 102a-n based on the at least one health parameter. The health category may reflect a probability S-CSCFs 102a-n will successfully handle registration with HSS 104 to which they are connected in response to a SIP registration request. Health categories may be identified by symbol, description, color, and the like. For example, S-CSCFs 102a-n may assign a health category identified by a color, such as a green health category to represent a healthy S-CSCF/HSS connection, an orange or yellow health category to represent a compromised but still functional S-CSCF/HSS connection, and a red health category to represent a S-CSCF/HSS connection that is not currently operational. S-CSCFs 102a-n may assign distinct weights to different health parameters based on a determined or anticipated impact the corresponding health parameters have on the S-CSCF/HSS connection, wherein the assigned weight indicates the extent to which the health parameter affects the S-CSCFs' 102a-n designations of the health categories. For example, a health parameter indicating that a connection between S-CSCF 102a and HSS 104 is broken may impact the health category of the S-CSCF 102a more than a health parameter based on an error response DIAMETER_TOO_BUSY. S-CSCFs 102a-n may further assign distinct weights within a type of health parameter. For example, S-CSCFs 102a-n may weigh various error response codes from HSS 104 with distinct weights based on the determined severity of the type of error has or is anticipated to have on the S-CSCF/HSS connection such that one type of error response code may affect the determination of a health category more than another type of error response code.

S-CSCFs 102a-n can send an indication of the health category of Cx interface 110 associated with the corresponding S-CSCFs 102a-n to I-CSCF 106. S-CSCFs 102a-n may send the health category to I-CSCF 106 via Diameter Interface 108. S-CSCFs 102a-n may update the health category of Cx interface 110 associated with the corresponding S-CSCFs 102a-n in response to detected changes in the at least one health parameter. S-CSCFs 102a-n may periodically or continuously check the status of one or more health parameters and revise their health determination and the health category of Cx interface 110 associated with the corresponding S-CSCFs 102a-n.

System 100 may include a plurality of S-CSCFs, for example and without limitation S-CSCFs 102*a-n* shown in FIG. 1. S-CSCFs 102*a-n* may form an S-CSCF cluster with which I-CSCF 106 communicates. S-CSCFs 102*a-n* each may communicate with I-CSCF 106 as described herein. For example, S-CSCFs 102*a-n* each may monitor at least one health parameter of Cx interface 110 associated with the corresponding S-CSCF 102*a-n*. S-CSCFs 102*a-n* each may determine a health category of Cx interface 110 associated with corresponding S-CSCFs 102*a-n* based on the at least one health parameter. S-CSCFs 102*a-n* may each be connected to I-CSCF 106 via a Diameter interface 108 and may each send to I-CSCF 106 an indication of the health category of its respective Cx interface 110, which may include an indication of the health status of the connection between the S-CSCF and its associated HSS, an indication of the health of the HSS, or both.

I-CSCF 106 may load balance SIP registration requests among S-CSCF 102*a-n* based on relative health statuses of their respective Cx interfaces 110. In performing the load balancing, I-CSCF 106 may assign a SIP registration request to S-CSCF 102*a* based on the received indication of the health category from the S-CSCF 102*a* indicating a better Cx interface health than the Cx interfaces 110 of the other S-CSCFs. If one or more of S-CSCFs has the same Cx interface health category, I-CSCF 106 may utilize round robin or other suitable method to select an S-CSCF for a given SIP registration request message. I-CSCF 106 may maintain a load balancing list of the identifiers of S-CSCFs 102*a-n* to which the I-CSCF 106 may send SIP registration requests. I-CSCF 106 may remove an identifier for a specific S-CSCF, for example, S-CSCF 102*b*, from the load balancing list in response to the S-CSCF 102*b* having a predetermined health category (for example, a heath category indicating poorer Cx interface health than that of the remaining S-CSCFs). Removing the identifier for S-CSCF 102*b* from the load balancing list ensures that I-CSCF 106 does not send SIP registration requests to the S-CSCF 102*b*. I-CSCF 106 may then restore the removed identifier for S-CSCF 102*b* to the load balancing list when it receives an indication of an improved health category from the S-CSCF 102*b*. I-CSCF 106 may update the load balancing list and/or add one or more S-CSCFs to the load balancing list based on one or more Cx health category. For example, if a health category for a particular S-CSCF, such as S-CSCF 102*a*, is set to orange, then I-CSCF 106 may reduce the priority of S-CSCF 102*a* in the load balancing list compared to other S-CSCFs with a green health category. Also, if an S-CSCF's health category has improved, then the priority is increased or restored. For example, if S-CSCF's 102*a* health category improves from orange to green, then I-CSCF 106 may increase S-CSCF's 102*a* priority. If S-CSCF 102*b* had a health category of red and was removed from the load balancing list but then the S-CSCF 102*b* had an updated health category of green, then I-CSCF 106 may add S-CSCF 102*b* to the load balancing list.

Figure 2:
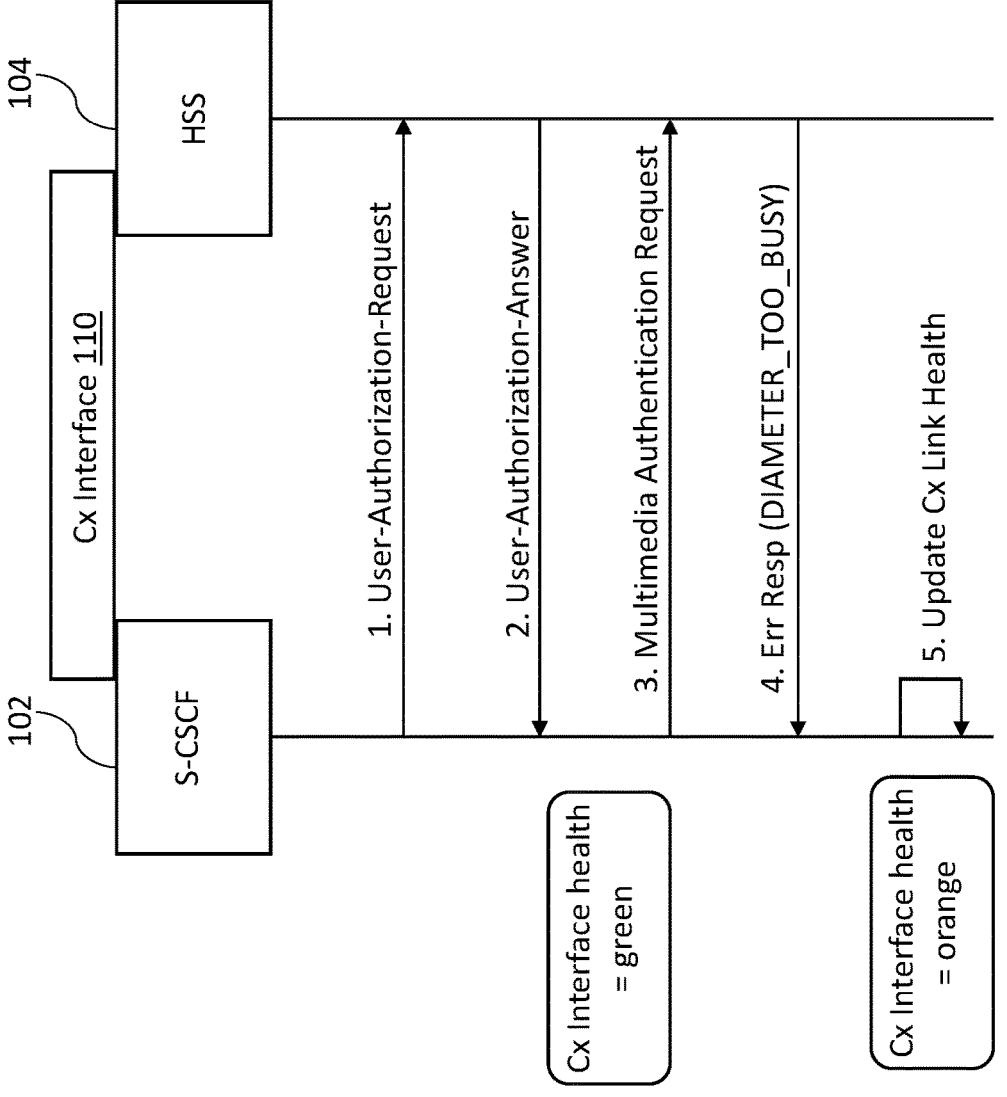
FIG. 2 is a message flow diagram illustrating example messages between an S-CSCF and an HSS on a Cx interface.

FIG. 2 is a message flow diagram illustrating example messages between S-CSCF 102 and HSS 104 on Cx interface 110 wherein the S-CSCF 102 updates a health status, such as a health category, of the connection between the S-CSCF 102 and the HSS 104 based on an error response code from the HSS 104. In line 1, S-CSCF 102 sends a User-Authorization-Request (UAR) to HSS 104 on Cx interface 110. In line 2, HSS 104 sends a User-Authorization-Answer (UAA) to S-CSCF 102 on Cx interface 110. S-CSCF 102 determines or adjusts the health status of Cx interface 110 based on the receipt of UAA by the S-CSCF

102 from HSS 104. In this instance, because S-CSCF 102 received UAA in response to UAR, there is no indication of any issue with Cx interface 110, and S-CSCF 102 sets the health status of Cx interface 110 to green. In line 3, S-CSCF 102 sends HSS 104 a Multimedia Authentication Request. In line 4, S-CSCF 102 receives an error response (DIAMETER_TOO_BUSY) from HSS 104. In line 5, S-CSCF 102 updates the health status of Cx interface 110 to orange based on the error message received from HSS 104.

Figure 3:
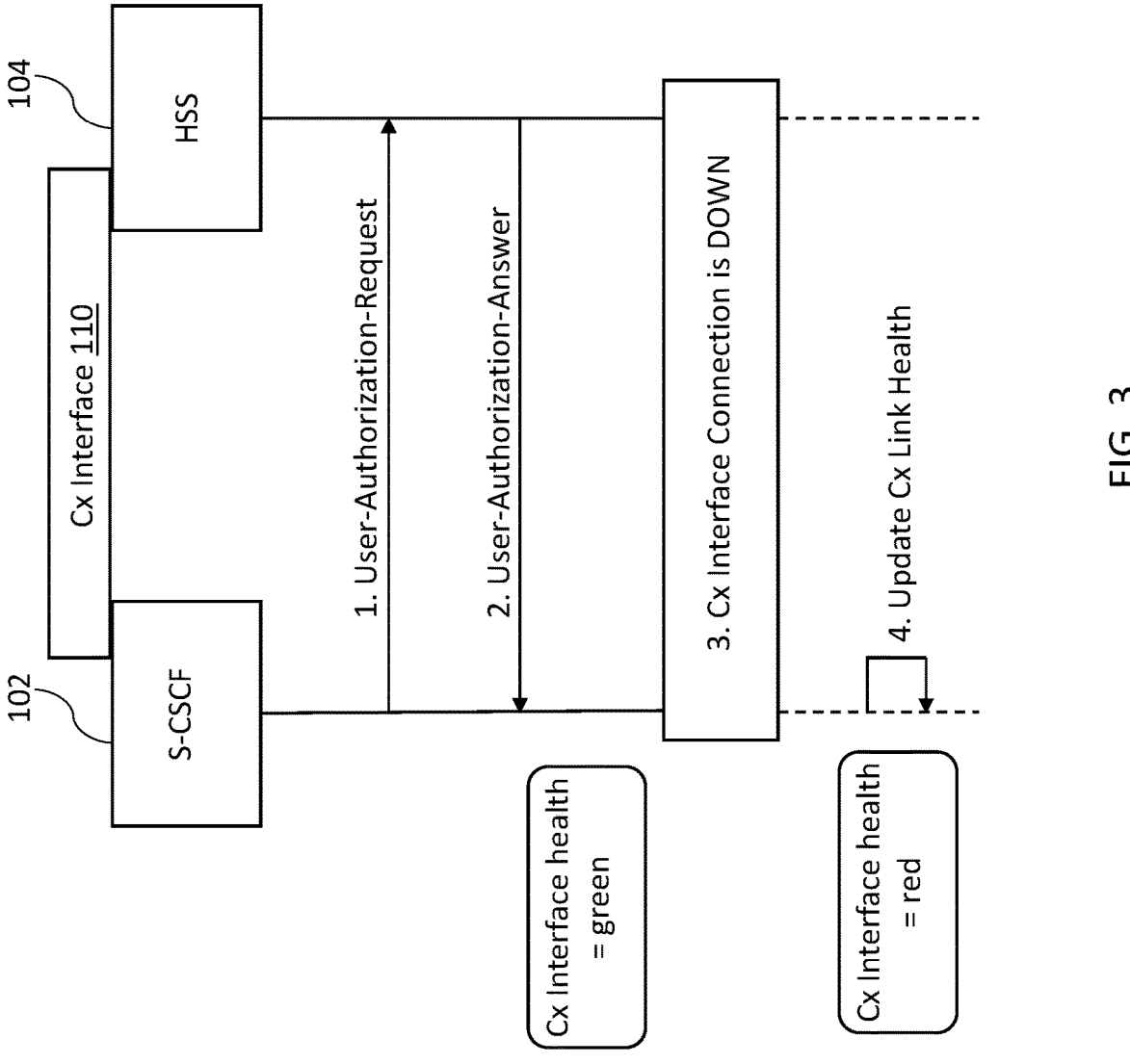
FIG. 3 is a message flow diagram illustrating example messages between an S-CSCF and an HSS on a Cx interface.

FIG. 3 is a message flow diagram illustrating example messages between S-CSCF 102 and HSS 104 on Cx interface 110 wherein the S-CSCF 102 updates a health status of the S-CSCF/HSS connection based on link availability of the Cx interface 110. In line 1, S-CSCF 102 sends an UAR to HSS 104 on Cx interface 110. In line 2, HSS 104 returns an UAA to S-CSCF 102 on Cx interface 110. In line 3, S-CSCF 102 identifies that Cx interface 110 is down. To determine whether Cx interface 110 is down, S-CSCF 102 may implement a timer, such as a watchdog, that counts down from the latest activity from HSS 104, refreshing with each new message from the HSS 104, and notifies S-CSCF 102 if the timer reaches zero. S-CSCF 102 may use Diameter keep-alive messages, for example Diameter device watchdog request and answer (DWR/DWA) messages, to identify when Cx interface 110 is down. S-CSCF 102 may determine that Cx interface 110 is down by identifying transport protocol specific connection termination messages. In line 4, S-CSCF 102 updates Cx interface 110 health status to red based on the Cx Interface 110 being down to indicate that the connection between the S-CSCF 102 and HSS 104 is not functioning.

Figure 4:
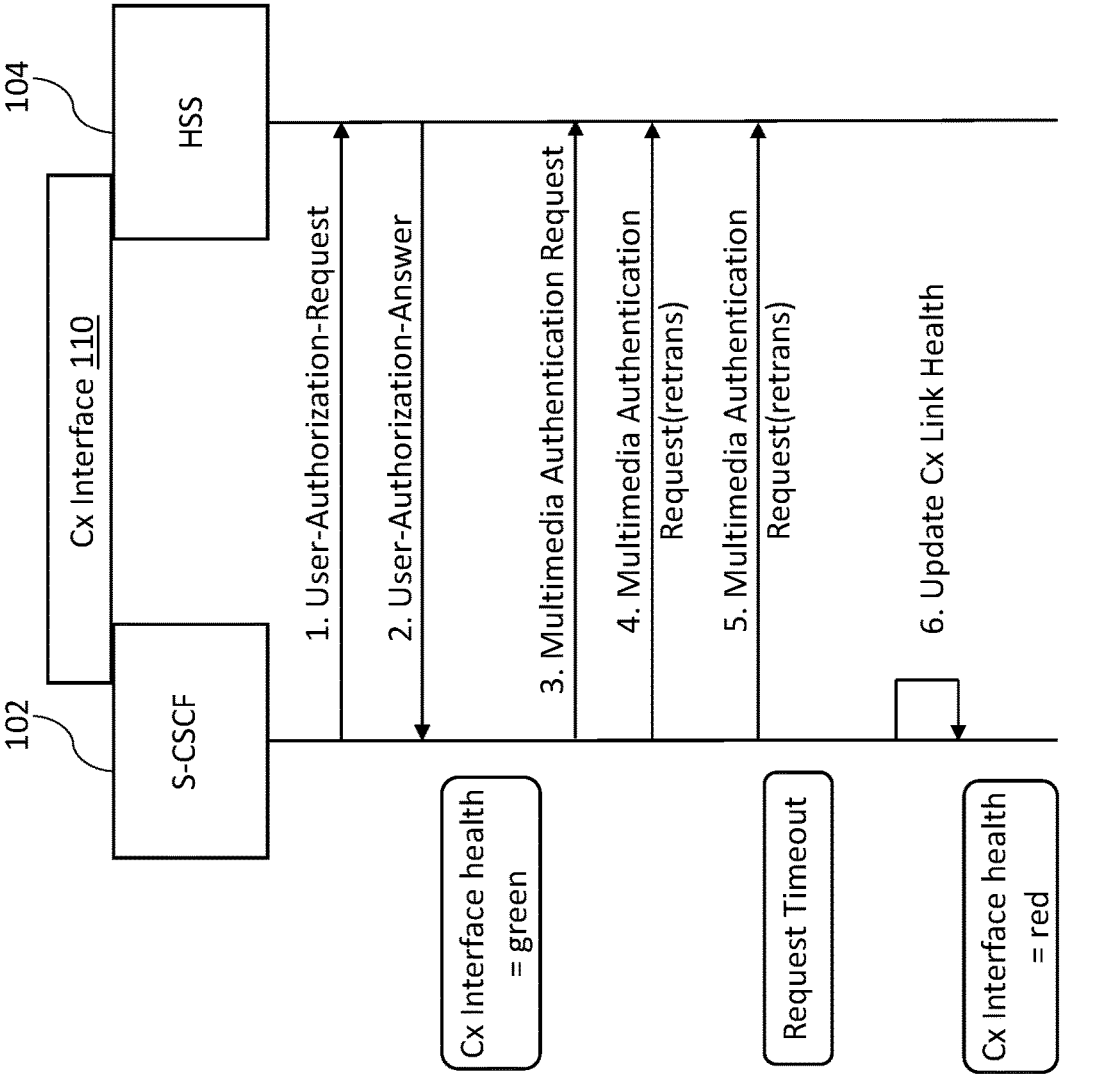
FIG. 4 is a message flow diagram illustrating example messages between an S-CSCF and an HSS on a Cx interface.

FIG. 4 is a message flow diagram illustrating example messages between S-CSCF 102 and HSS 104 on Cx interface 110 wherein the S-CSCF 102 updates a health status of the S-CSCF/HSS connection based on availability of the HSS 104. In line 1, S-CSCF 102 sends an UAR to HSS 104 on Cx interface 110. In line 2, HSS 104 sends an UAA to S-CSCF 102 on Cx interface 110. In line 3, S-CSCF 102 sends HSS 104 a Multimedia Authentication Request. S-CSCF 102 does not receive a response to the Multimedia Authentication Request, so retransmits the Multimedia Authentication Request in line 4. S-CSCF 102 still does not receive a response to the retransmitted Multimedia Authentication Request, so again retransmits the Multimedia Authentication Request in line 5. The Multimedia Authentication Request times out and S-CSCF 102 determines that the connection between the S-CSCF 102 and HSS 104 is up but timing out and updates the Cx interface 110 health status to red in line 6.

Figure 5:
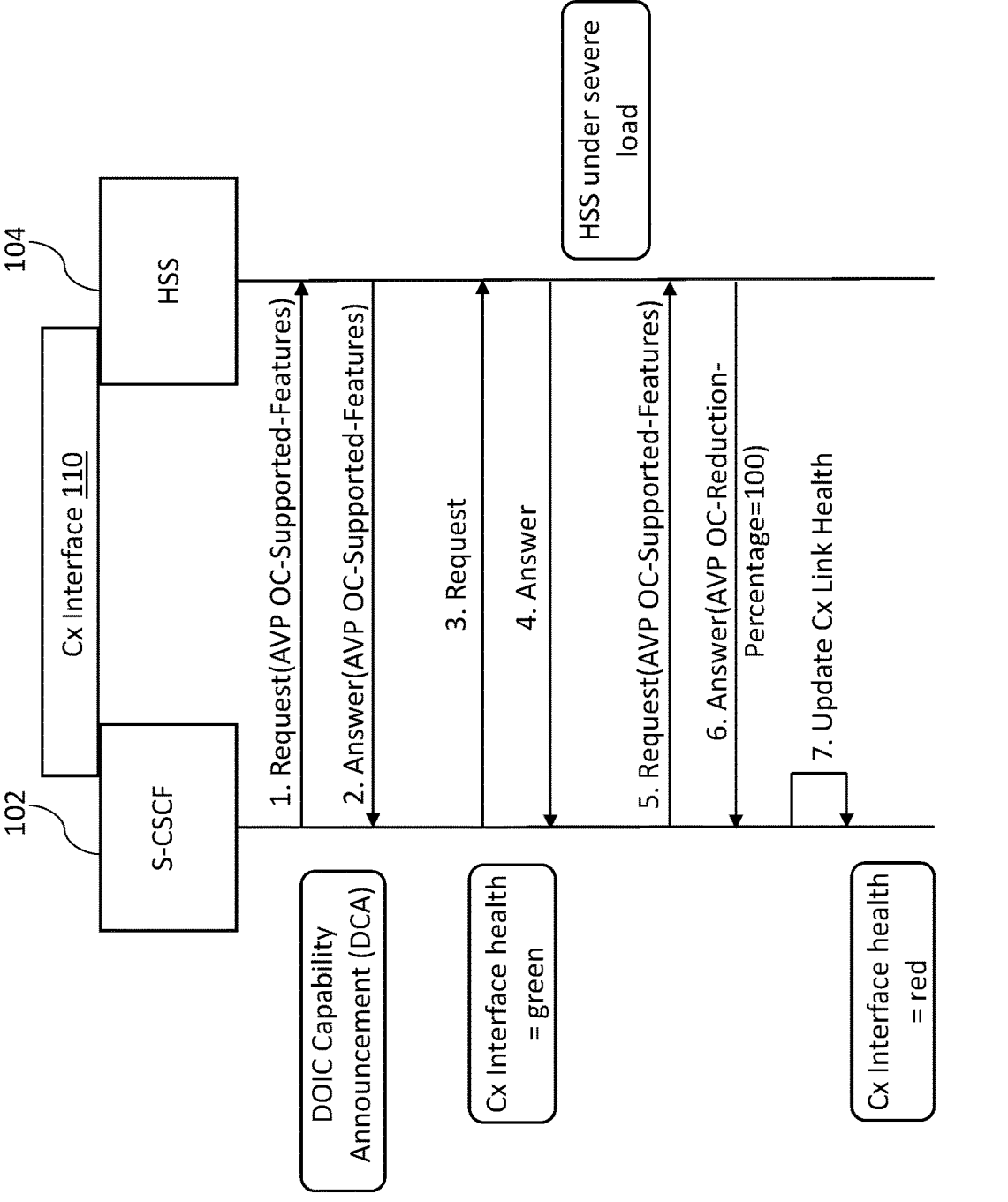
FIG. 5 is a message flow diagram illustrating example messages between an S-CSCF and an HSS on a Cx interface.

FIG. 5 is a message flow diagram illustrating example messages between S-CSCF 102 and HSS 104 on Cx interface 110 wherein the S-CSCF 102 updates a health status of the S-CSCF/HSS connection based on DOIC, such as overload reports, from the HSS 104. FIG. 5 shows a DOIC Capability Announcement (DCA) between S-CSCF 102 and HSS 104 in lines 1 and 2. DOIC information, such as the DCA, is piggybacked on existing Diameter messages by inserting new Attribute Value Pairs (AVPs) into the existing requests or responses. The DCA procedure allows a DOIC reacting node, such as HSS 104, to indicate to a DOIC reporting node, such as S-CSCF 102, which DOIC capabilities the reacting node supports, and the reporting node responds with which capabilities it wants to employ. In line 1, S-CSCF 102 sends Request (AVP OC-Supported-Features) to HSS 104, which is a request message with piggybacked DOIC information including an AVP identifying Overload Condition (OC) features. In line 2, HSS 104 responds by sending to S-CSCF 102 Answer (AVP OC-Supported-Features) acknowledging receipt of Request (AVP OC-Supported-Features). In line 3, S-CSCF 102 sends to HSS 104 a request, and the HSS 104 return an answer to the S-CSCF 102 in line 4. Based on receipt by S-CSCF 102 of the answer in line 4 from HSS 104, the S-CSCF 102 sets the health status of Cx interface 110 to green. In line 5, S-CSCF 102 sends Request (AVP OC-Supported-Features) to HSS 104. However, in this example, HSS 104 is under a severe load and sends to S-CSCF 102 Answer (AVP OC-Reduction-Percentage=100), which contains an OC-Reduction-Percentage AVP stating a percentage of traffic for the S-CSCF 102 to throttle to the HSS 104.

The OC-Reduction-Percentage AVP (AVP Code 627) is of type Unsigned32 and describes the percentage of the traffic that the sender is requested to reduce, compared to what it otherwise would send. The value of the Reduction-Percentage AVP is between zero (0) and one hundred (100). Values greater than 100 are ignored. The value of 100 means that all traffic is to be throttled, i.e., the reporting node is under a severe load and ceases to process any new messages. The value of 0 means that the reporting node is in a stable state and has no need for the reacting node to apply any traffic abatement. Therefore HSS 104 setting the value of the Reduction-Percentage AVP to 100 in line 5 instructs S-CSCF 102 to throttle all traffic to the HSS 104, indicating that the HSS 104 is currently not able to receive any traffic. Based on the OC-Reduction-Percentage AVP, S-CSCF 102 updates the Cx interface health status to red. S-CSCF 102 may include a predetermined value range for health categories. For example, S-CSCF 102 may assign a green health category if the value of the Reduction-Percentage AVP is between zero (0) and nineteen (19), an orange health category if the value of the Reduction-Percentage AVP is between twenty (20) and eighty-nine (89), and a red category if the value of the Reduction-Percentage AVP is between zero (90) and one hundred (100).

Figure 6:
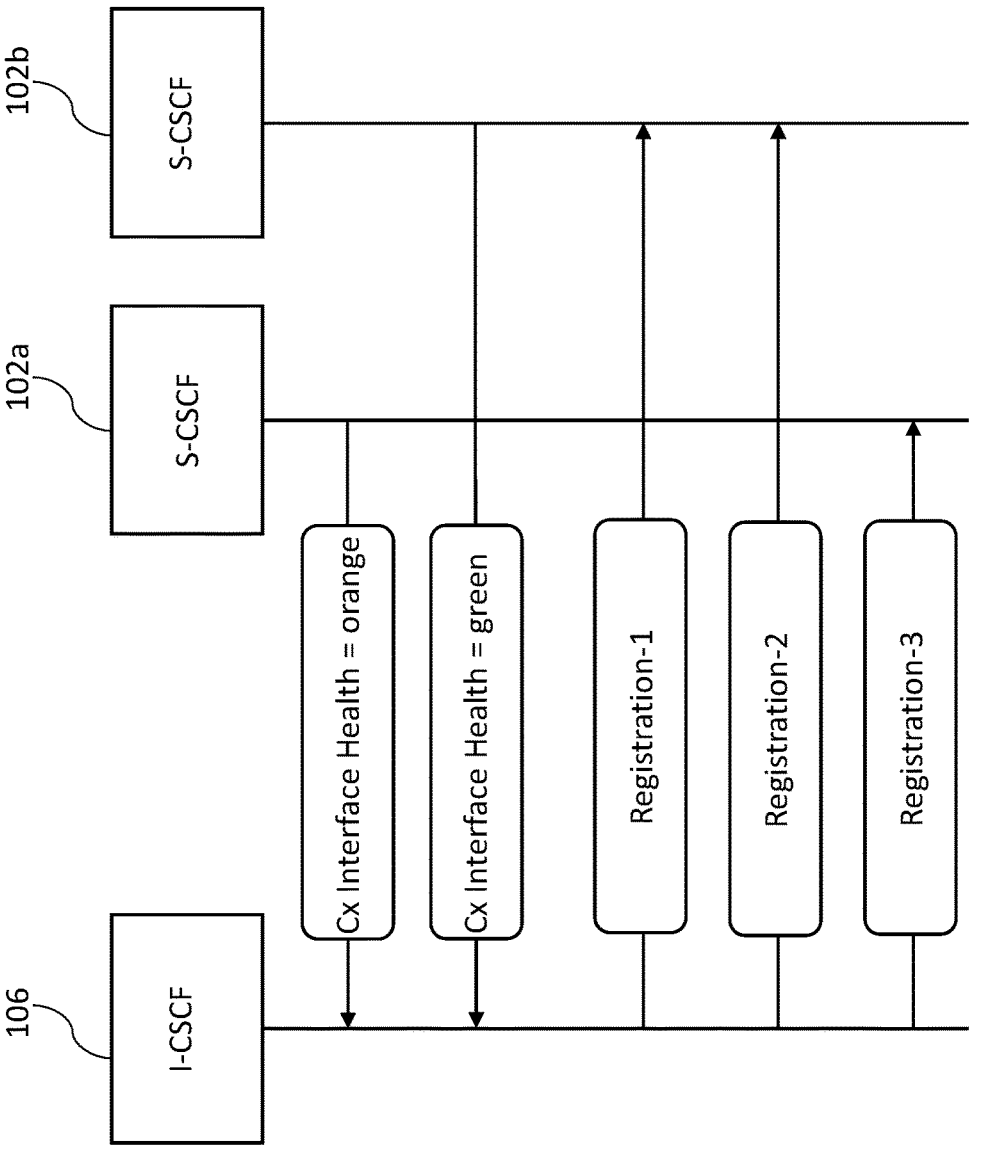
FIG. 6 is a message flow diagram illustrating an I-CSCF performing load balancing based on Cx interface health status.

FIG. 6 is a message flow diagram illustrating I-CSCF 106 load balancing SIP registration requests among S-CSCF 102*a* and S-CSCF 102*b*. In this example, S-CSCF 102*a* sends an indication to I-CSCF 106 of the health category of HSS 104 (not shown), for example the health status of the connection between S-CSCF 102*a* and HSS 104, which is designated orange. S-CSCF 102*b* sends an indication to I-CSCF 106 of the health category of HSS 104, namely the health status of the connection between S-CSCF 102*b* and HSS 104, which is designated green. I-CSCF 106 sends more SIP registration requests to S-CSCF 102*b* than to S-CSCF 102*a* because of the better health status S-CSCF 102*a* reported to I-CSCF 106. In the example shown, I-CSCF 106 sends SIP registration requests Registration-1 and Registration-2 to S-CSCF 102*b* while only sending SIP registration request Registration-3 to S-CSCF 102*a*. It is understood that FIG. 6 only displays two S-CSCFs, i.e., S-CSCF 102*a* and S-CSCF 102*b*, for illustrative purposes and load balancing is not limited to two S-CSCFs. I-CSCF 106 may load balance registration requests among S-CSCF 102*a-n*.

Figure 7:
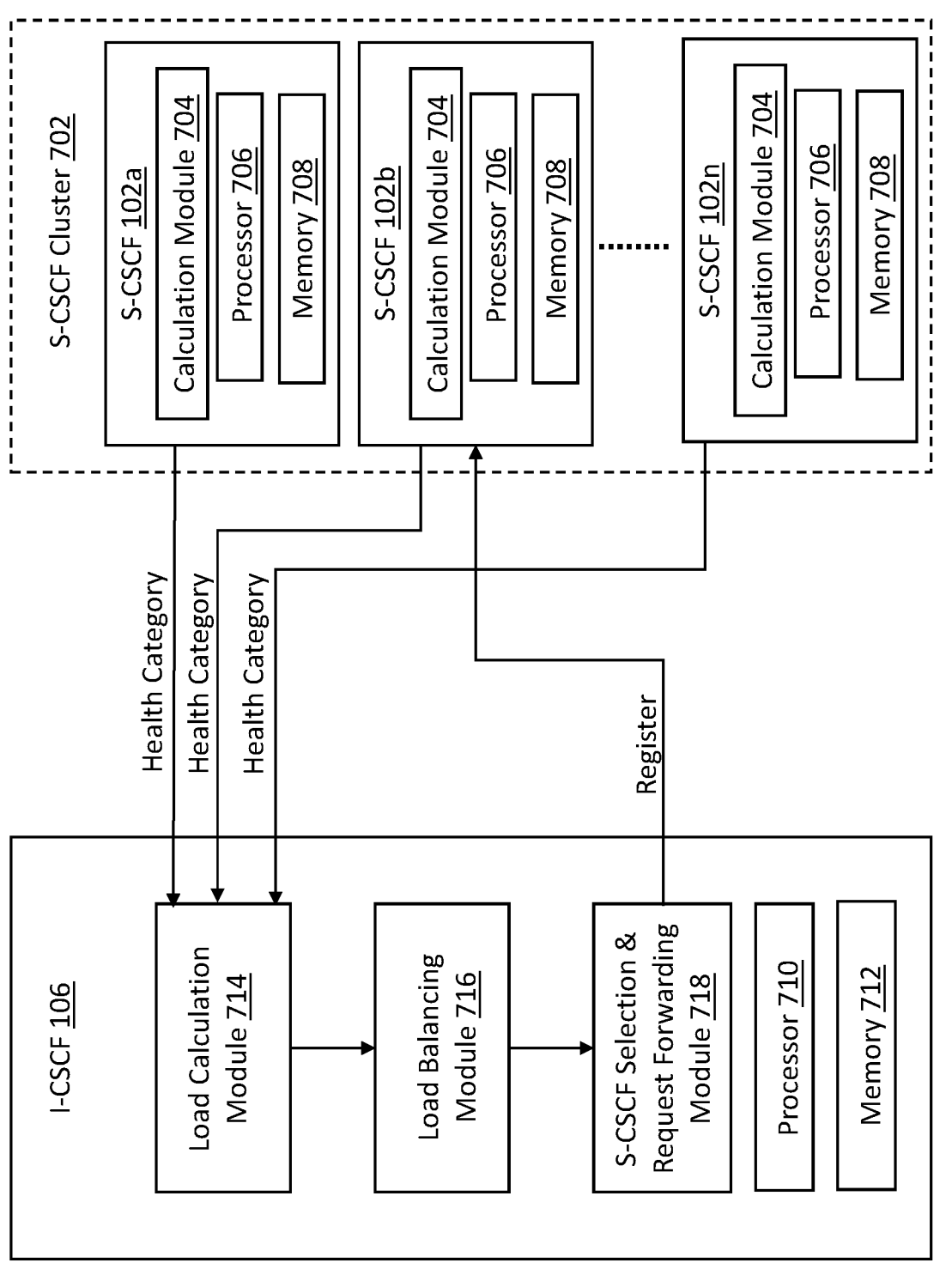
FIG. 7 is a block diagram illustrating example modules of an S-CSCF and an I-CSCF.

FIG. 7 is a block diagram illustrating example modules of S-CSCFs 102*a-n* and I-CSCF 106. S-CSCFs 102*a-n* in S-CSCF cluster 702 each may include a Calculation Module 704 configured for determining the health category of HSS 104. S-CSCFs 102*a-n* each may include at least one processor 706 and a memory 708 configured for implementing Calculation Module 704. Calculation Module 704 may receive one or more health parameters of each Cx interface 110 associated with S-CSCFs 102*a-n* and determine the health category based on the one or more health parameters, which S-CSCF 102*a-n* then sends to I-CSCF 106. I-CSCF 106 may include at least one processor 710 and a memory 712 configured for implementing the steps described herein. I-CSCF 106 may include a Load Calculation Module 714 that monitors and receives the health category of Cx interface 110 associated with corresponding S-CSCF 102*a-n* from the S-CSCF 102*a-n*. Load Calculation Module 714 may forward the health category to a Load Balancing Module 716 configured for load balancing based on the health categories received from S-CSCF 102*a-n*. I-CSCF 106 may include a S-CSCF Selection and Request Forwarding Module 718 that implements the load balancing determined by Load Balancing Module 716 and sends a SIP registration request to a selected S-CSCF 102, for example S-CSCF 102*b* shown in FIG. 7.

FIG. 8 is a flow diagram illustrating an example method 800 for load balancing SIP registration requests using Cx interface health status. At step 802, an S-CSCF monitors at least one health parameter of a Cx interface associated with the S-CSCF. The at least one health parameter may include a first health parameter based on a ratio of error responses to successful responses received by the S-CSCF within a predetermined time period, a second health parameter based on availability of a connection between the S-CSCF and the HSS, and/or a third health parameter based on a DOIC.

At step 804, the S-CSCF determines a health category of the Cx interface associated with the S-CSCF based on the at least one health parameter. The health category may reflect a probability the S-CSCF will successfully handle registration with an HSS in response to a SIP registration request.

At step 806, the S-CSCF sends to an I-CSCF an indication of the health category of the Cx interface associated with the S-CSCF.

At step 808, the I-CSCF load balances SIP registration requests between the S-CSCF and at least one additional S-CSCF based on the received indication of the health category of the Cx interface associated with the S-CSCF. Load balancing the SIP registration requests directed towards the S-CSCF may include assigning, by the I-CSCF, a SIP registration request to the S-CSCF based on the received indication of the health category. The method may further include monitoring, by the at least one additional S-CSCF, at least one health parameter of a Cx interface associated with the at least one additional S-CSCF. The method may further include determining, by the at least one additional S-CSCF and based on the at least one health parameter, a health category of the Cx interface associated with the Cx interface associated with the at least one additional S-CSCF. The method may further include sending, by the at least one additional S-CSCF and to the I-CSCF, an indication of the health category of the Cx interface associated with the at least one additional S-CSCF, wherein load balancing the SIP registration requests between the S-CSCF and the at least one additional S-CSCF comprises assigning a greater number of SIP registration requests to the S-CSCF than to the at least one additional S-CSCF in response to the health category of the Cx interface associated with the S-CSCF indicating better health than the health category of the Cx interface associated with the at least one additional S-CSCF. Load balancing the SIP registration requests may include removing an identifier for the S-CSCF from a load balancing list in response to S-CSCF having a predetermined health category. The S-CSCF may update the health category of the Cx interface associated with the S-CSCF in response to detected changes in the at least one health parameter.

It will be appreciated that method 800 is for illustrative purposes and that different and/or additional actions may be used. It will also be appreciated that various actions described herein may occur in a different order or sequence. It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

The disclosure of each of the following references is hereby incorporated herein by reference in its entirety.

REFERENCES

1. Korhonen et al., Diameter Overload Indication Conveyance, IETF RFC 7683 (October 2015).

What is claimed is:

1. A method for load balancing session initiation protocol (SIP) registration requests using Cx interface health status, the method comprising:

monitoring, by a Serving Call Session Control Function (S-CSCF), at least one health parameter of a Cx interface associated with the S-CSCF, wherein the Cx interface is an interface through which the S-CSCF communicates with a home subscriber server (HSS);

determining, by the S-CSCF and based on the at least one health parameter, a health category of the Cx interface associated with the S-CSCF;

sending, by the S-CSCF and to an Interrogating Call Session Control Function (I-CSCF), an indication of the health category of the Cx interface associated with the S-CSCF; and load balancing, by the I-CSCF, SIP registration requests between the S-CSCF and at least one additional S-CSCF based on the received indication of the health category of the Cx interface associated with the S-CSCF.

2. The method of claim 1 wherein the health category reflects a probability the S-CSCF will successfully handle registration with the HSS in response to a SIP registration request.

3. The method of claim 1 wherein load balancing the SIP registration requests directed towards the S-CSCF comprises assigning, by the I-CSCF, a SIP registration request to the S-CSCF based on the received indication of the health category.

4. The method of claim 1 comprising:

monitoring, by the at least one additional S-CSCF, at least one health parameter of a Cx interface associated with the at least one additional S-CSCF;

determining, by the at least one additional S-CSCF and based on the at least one health parameter, a health category of the Cx interface associated with the at least one additional S-CSCF;

sending, by the at least one additional S-CSCF and to the I-CSCF, an indication of the health category of the Cx interface associated with the at least one additional S-CSCF, wherein load balancing the SIP registration requests between the S-CSCF and the at least one additional S-CSCF comprises assigning a greater number of SIP registration requests to the S-CSCF than to the at least one additional S-CSCF in response to the health category of the Cx interface associated with the S-CSCF indicating better health than the health category of the Cx interface associated with the at least one additional S-CSCF.

5. The method of claim 1 wherein load balancing the SIP registration requests includes removing an identifier for the S-CSCF from a load balancing list in response to the Cx interface associated with the S-CSCF having a predetermined health category.

6. The method of claim 5 comprising updating, by the S-CSCF, the health category of the Cx interface associated with the S-CSCF in response to detected changes in the at least one health parameter.

7. The method of claim 1 wherein the at least one health parameter comprises a first health parameter based on a ratio of error responses to successful responses received by the S-CSCF within a predetermined time period.

8. The method of claim 7 wherein the at least one health parameter comprises a second health parameter based on availability of a connection between the S-CSCF and the HSS.

9. The method of claim 8 wherein the at least one health parameter comprises a third health parameter based on a Diameter Overload Indication Conveyance (DOIC).

10. A system for load balancing session initiation protocol (SIP) registration requests using Cx interface health status, the system comprising:

a Serving Call Session Control Function (S-CSCF) including at least one processor and a memory and configured for:

monitoring at least one health parameter of a Cx interface associated with the S-CSCF, wherein the Cx interface is an interface through which the S-CSCF communicates a home subscriber server (HSS);

determining a health category of the Cx interface associated with the S-CSCF based on the at least one health parameter;

sending, to an Interrogating Call Session Control Function (I-CSCF), an indication of the health category of the Cx interface associated with the S-CSCF; and an Interrogating Call Session Control Function (I-CSCF) including at least one processor and a memory and configured for:

load balancing SIP registration requests between the S-CSCF and at least one additional S-CSCF based on the received indication of the health category of the Cx interface associated with the S-CSCF.

11. The system of claim 10 wherein the health category reflects a probability the S-CSCF will successfully handle registration with an HSS in response to a SIP registration request.

12. The system of claim 10 wherein load balancing the SIP registration requests directed towards the S-CSCF comprises assigning a SIP registration request to the S-CSCF based on the received indication of the health category.

13. The system of claim 10 comprising the at least one additional S-CSCF, the at least one additional S-CSCF is configured for:

monitoring at least one health parameter of a Cx interface associated with the at least one additional S-CSCF;

determining, based on the at least one health parameter, a health category of the Cx interface associated with the at least one additional S-CSCF;

sending, to the I-CSCF, an indication of the health category of the Cx interface associated with the at least one additional S-CSCF, wherein load balancing the SIP registration requests between the S-CSCF and the at least one additional S-CSCF comprises assigning a greater number of SIP registration requests to the S-CSCF than to the at least one additional S-CSCF in response to the health category of the Cx interface associated with the S-CSCF indicating better health than the health category of the Cx interface associated with the at least one additional S-CSCF.

14. The system of claim 10 wherein load balancing the SIP registration requests includes removing an identifier for the S-CSCF from a load balancing list in response to the Cx interface associated with the S-CSCF having a predetermined health category.

15. The system of claim 14 wherein the S-CSCF is configured for updating the health category of the Cx interface associated with the S-CSCF in response to detected changes in the at least one health parameter.

16. The system of claim 10 wherein the at least one health parameter comprises a first health parameter based on a ratio of error responses to successful responses received by the S-CSCF within a predetermined time period.

17. The system of claim 16 wherein the at least one health parameter comprises a second health parameter based on availability of a connection between the S-CSCF and the HSS.

18. The system of claim 17 wherein the at least one health parameter comprises a third health parameter based on a Diameter Overload Indication Conveyance (DOIC).

19. A non-transitory computer readable medium having stored thereon executable instructions that when executed by at least one processor of at least one computer cause the at least one computer to perform steps comprising:
at a Serving Call Session Control Function (S-CSCF):
monitoring at least one health parameter of a Cx interface associated with the S-CSCF, wherein the Cx interface is an interface through which the S-CSCF communicates with a home subscriber server (HSS);
determining a health category associated of the Cx interface associated with the S-CSCF based on the at least one health parameter; and
sending, to an Interrogating Call Session Control Function (I-CSCF), an indication of the health category of the Cx interface associated with the S-CSCF; and
at an Interrogating Call Session Control Function (I-CSCF):
load balancing SIP registration requests between the S-CSCF and at least one additional S-CSCF based on the received indication of the health category of the Cx interface associated with the S-CSCF.

20. The non-transitory computer readable medium of claim 19 wherein load balancing the SIP registration requests directed towards the S-CSCF comprises assigning a SIP registration request to the S-CSCF based on the received indication of the health category.

\* \* \* \* \*